UNITED STATES PATENT OFFICE.

GEORGE W. SCOLLAY, OF NEW YORK, N. Y.

PRESERVING CLAM EXTRACTS.

SPECIFICATION forming part of Letters Patent No. 511,551, dated December 26, 1893.

Application filed February 18, 1893. Serial No. 462,840. (No specimens.)

*To all whom it may concern:*

Be it known that I, GEORGE W. SCOLLAY, a citizen of the United States, residing in the city, county, and State of New York, have invented certain new and useful Improvements in Food Products and the Treatment and Preservation of the Same, of which the following is a description.

My invention relates to food products and it consists of a new article or articles as specifically pointed out in the claim concluding this specification.

Bottled clam juice is now a well-known article of trade. It is commonly prepared by chopping clams fine and boiling them in their juice until the fluid is more or less concentrated. It is well known that clam juice so prepared often throws down a precipitate or becomes cloudy, due to the fact that certain component parts are, or become insoluble in the fluid. This difficulty increases as concentration is carried further. The desirability of devising some means by which the juice may be permanently preserved in an entirely fluid condition and may be even still more concentrated without rendering component parts thereof insoluble or, in other words, whereby a stronger fluid extract may be obtained, is obvious. I have discovered that carbonic acid gas is either a solvent for these insoluble elements or by chemical changes due to its presence or pressure they are rendered soluble in the fluid, for I find that the introduction of such gas into the juice dissolves the sediment and that the more gas introduced the further may concentration be carried, without separation and without opacity or cloudiness and hence the stronger may the fluid extract be made.

In the practice of my invention after the juice has been prepared, I pass carbonic acid gas through it. Of this gas it will absorb when cold (60° Fahrenheit) something more than an equal volume. The juice may then be bottled and is ready for the market. Instead of charging the juice with only the quantity of carbonic acid gas that it will absorb I prefer to supercharge it therewith, and in this condition it may be put up in any suitable case as, for example, in siphon bottles such as are used for containing manufactured mineral waters.

What I claim is—

As a new article, clam juice concentrated to a degree whereat some of the elements are or become insoluble in the fluid and charged with carbonic acid gas.

GEO. W. SCOLLAY.

Witnesses:
M. WILSON,
J. EDGAR BULL.